H. B. HULL

Dec. 6, 1932. REFRIGERATING APPARATUS Re. 18,685

Original Filed Feb. 25, 1924

Inventor
Harry B. Hull
By Spencer Sewall and Hardman
His Attorneys.

Reissued Dec. 6, 1932

Re. 18,685

UNITED STATES PATENT OFFICE

HARRY B. HULL, OF DAYTON, OHIO, ASSIGNOR, BY MESNE ASSIGNMENTS, TO FRIGIDAIRE CORPORATION, A CORPORATION OF DELAWARE

REFRIGERATING APPARATUS

Original No. 1,779,542, dated October 28, 1930, Serial No. 694,928, filed February 25, 1924. Application for reissue filed March 28, 1932. Serial No. 601,659.

This invention relates to refrigerating apparatus and more particularly to the type of apparatus adapted for household use having means for freezing ice cubes from water which is placed in trays, the trays being received by a cooling unit in the refrigerator cabinet.

One of the objects of the invention is to provide for releasing the ice cubes from the trays in which they are frozen. One manner of accomplishing this is to provide for holding an ice tray in inverted position and subjecting the same to the action of a relatively warm medium in the cabinet such as a current of relatively warm air so that the cubes may melt slightly and drop from the tray into a suitable receptacle. In one of the forms of the invention shown herein the ice tray from which the cubes are to be released is placed in inverted position and serves as a shelf to support a tray containing water to be frozen. There is a transfer of heat from the water to the ice tray containing the frozen cubes causing the cubes to melt slightly and be released by their own weight from the ice tray.

Further objects and advantages of the present invention will be apparent from the following description, reference being had to the accompanying drawing, wherein a preferred form of embodiment of the present invention is clearly shown.

Figure 1:
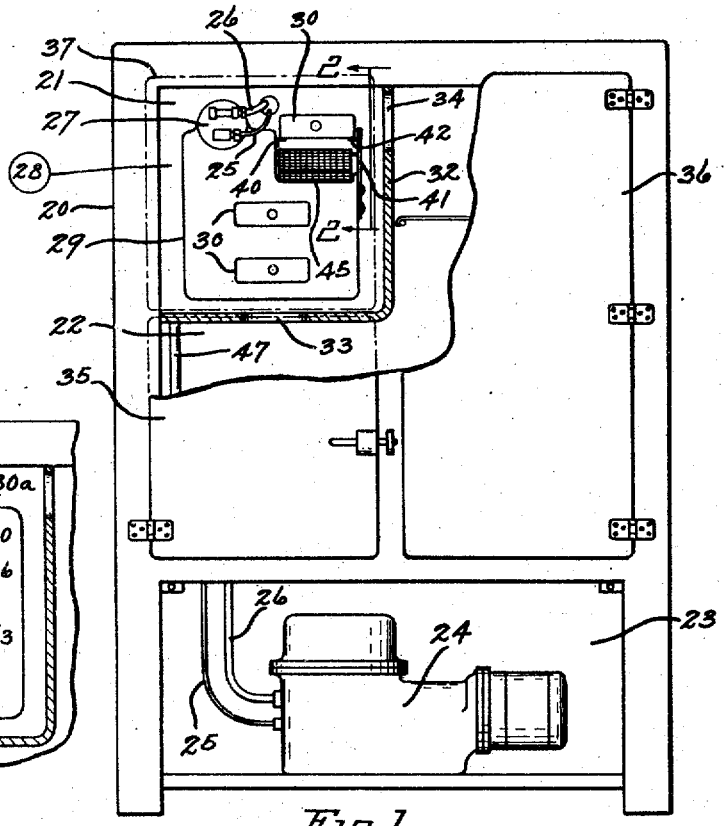
Fig. 1 is a front elevation partly broken away of a refrigerator cabinet containing a refrigerating machine equipped with the present invention.

Referring to the drawing, the refrigerator cabinet shown in Fig. 1 includes a cooling chamber 21 and a food chamber 22 and a machinery chamber 23. In chamber 23 there is located a refrigerating unit 24 which includes a motor driven compressor and condenser connected by pipes 25 and 26 with the evaporating chamber 27 of the cooling unit 28. Unit 28 includes a brine tank 29 which is cooled by the evaporation of the refrigerant in the evaporator 27. The brine tank 29 is provided with recesses adapted to receive one or more ice trays 30 which are divided by suitable partitions so that water in the trays will be frozen into a plurality of ice cubes 31 (see Fig. 2). The partition 32 which divides the food chamber 22 from the cooling chamber 31 is provided with openings 33 and 34. During the operation of the cooling apparatus the cold air descends from the cooling chamber 31 through the aperture 33 causing warmer air to enter the cooling chamber through the aperture 34.

The food chamber is closed by doors 35 and 36, and the cooling chamber 21 by a separate door 37 indicated by dot and dash lines in Fig. 1. Consequently access to the cooling chamber may be had without opening the food chamber directly to outside atmosphere.

Figure 2:
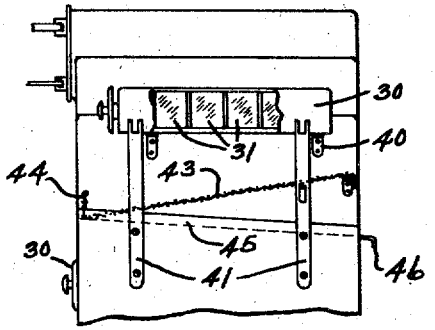
Fig. 2 is a side view of the cooling unit shown in Fig. 1, this view being taken along the line 2—2 of Fig. 1.

In order to facilitate the removal of the ice cubes from the trays 30 advantage is taken of the entrance of warm air into the cooling chamber 21 through the opening 34. The brine tank 29 is so formed that it may support an ice tray 30 in inverted position adjacent the opening 34 so as to subject the ice in the tray to the action of the warm air entering through the opening 34. The brine tank 29 supports an angle iron 40, and brackets 41 provided with horizontal ears 42 in the same horizontal plane with the horizontal flange of the angle iron 40. In this manner a shelf is provided for placing thereon in inverted position one of the ice trays 30 as shown in Fig. 2. The top surface of the brine tank 29 and the top edges of the brackets 41 extend above the lower edge of the tray 30, as inverted, so as to limit sidewise movement of the tray 30. Under the tray 30 there is located a shelf 43 made of wire screen material having a flange 44 along its lower edge. This shelf is downwardly inclined toward the door 37 of the cabinet. As the ice cubes 31 are melted slightly, due to the action of warmer air, they will be loosened from the inverted tray and will fall upon the screen 43 and some of the cubes may slide down against the flange 44. By opening the door 37 these cubes may be removed from the cooling chamber. Water dripping from the cubes and inverted tray is caught by an inclined chute 45 provided by an upper surface of the brine tank 29. The water collecting on this chute will drain from a lip 46 upon the partitions 32 and can be carried away through a drain pipe 47.

Figure 3:
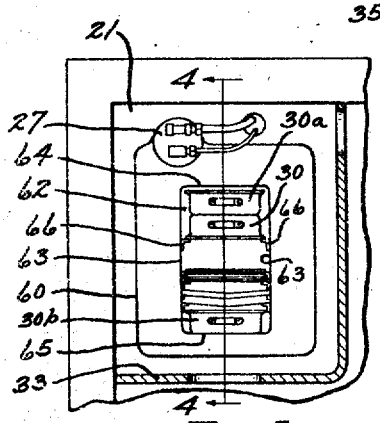
Fig. 3 is a fragmentary view of a refrigerator cabinet showing a cooling unit employing a modified form of the invention.
Figure 4:
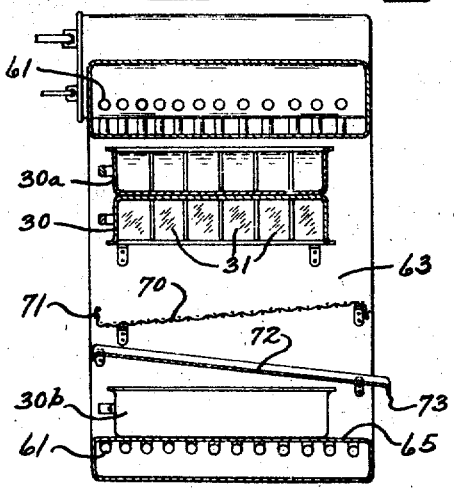
Fig. 4 is a sectional view on the line 4—4 of Fig. 3.

In the form of the invention shown in Figs. 3 and 4, the brine tank 60 in which are located the refrigerant coils 61 connected with the evaporator 27, is in the form of a hollow rectangular tubular member including a central recess 62 bounded by side walls 63, a top wall 64 and a bottom wall 65. The side walls 63 carry angle irons 66 adapted to support an ice tray 30 in inverted position, and one at 30*a* in normal position. The side walls 33 are spaced so that sidewise movement of the trays is limited in order that the trays will not be disengaged accidently from the brackets 66. The bottom wall 65 may support another tray 30*b*. Between the brackets 66 and the tray 30*b*, the side walls 33 support an ice cube receiving shelf 70 provided with a flange 71 at the lower edge of the shelf 70 which is adjacent the door 37 of the cooling chamber 21, as in the case of the shelf 42 shown in Fig. 2. Below the screen shelf 70 there is located a drain board or chute 72 which is inclined toward the rear wall of the refrigerator cabinet and is provided with a lip 73 from which water drains upon the partition 33 and is carried away by suitable drain pipes.

In order to use the invention shown in Figs. 3 and 4, water is placed in one of the ice trays and this tray is placed upon the wall 65 of the brine tank. After the water therein has been frozen into cubes it is placed in inverted position indicated at 30 in Fig. 4. In order to loosen the ice cubes 31 in the tray 30, a tray 30*a* containing water is placed upon the tray 30. On account of the transfer of heat from the water in 30*a* to the ice in tray 30, the ice cubes will be loosened and fall upon the screen shelf 70. Water dripping from the tray 30 and the ice cubes on the shelf 71 will be caught by the drain board 72 and be conducted away. It is apparent that the shelves 43 and 70 in the structures are exposed to a relatively colder temperature than the trays when said trays are in the ice releasing position. Consequently after the ice cubes have been released from the tray they will be exposed to a relatively colder zone and will not melt appreciably, if at all.

The advantages of this invention are apparent since the operation of the refrigerating apparatus is used to loosen the ice cubes, therefore, the user does not need to resort to the use of an ice pick or the practice of placing the tray in water in order to loosen the cubes.

While the form of embodiment of the present invention as herein disclosed, constitutes a preferred form, it is to be understood that other forms might be adopted, all coming within the scope of the claims which follow.

What is claimed is as follows:

1. Refrigerating apparatus comprising, in combination, a cabinet, a cooling unit therein, means associated with the cooling unit for holding a receptacle of substance to be frozen, and means for holding the tray in inverted position and subjecting the same to a relatively warm medium in the cabinet whereby the substance therein will be loosened and fall from the tray, means for receiving the substance dropped from said tray and means for draining the water therefrom.

2. Refrigerating apparatus comprising, in combination, a cabinet, a cooling unit therein, means associated with the cooling unit for holding a tray of water to be frozen, brackets carried by the cooling unit for supporting the tray in an inverted position in a current of warmer air circulating adjacent the top of the cooling unit, and means supported by the unit for receiving the ice falling from the tray.

3. Refrigerating apparatus comprising a cabinet having a food compartment and a cooling compartment, a wall therebetween having an opening to permit circulation of warm air from the food compartment to the cooling compartment, and means in the cooling compartment for supporting a tray of frozen substance in an inverted position adjacent the aforesaid opening in the wall and in the path of the circulating air.

4. In a refrigerating apparatus comprising, in combination, a cabinet, a cooling unit therein, means associated with the cooling unit for holding a receptacle of substance to be frozen in a relatively cold portion of the cabinet, and for holding the receptacle in inverted position in a relatively warm portion of the cabinet whereby the frozen substance therein will be loosened and fall from the receptacle, and storage means disposed in a relatively cold portion of said cabinet for receiving the frozen substance as it fall from said receptacle.

5. Refrigerating apparatus comprising, in combination, a cabinet, a cooling unit therein, means associated with the cooling unit for holding a receptacle of material to be frozen, and means carried by the cooling unit for holding the receptacle in inverted position and in heat absorbing relation to a relatively warm air current in the cabinet whereby the ice therein will be loosened and fall from the tray, said last named means being accessible for manipulating said receptacle from the front of said cabinet.

6. In a refrigerating apparatus comprising in combination, a cabinet, cooling means therein, a receptacle adapted to contain a substance to be frozen, means for holding the receptacle in intimate heat exchange relation with the cooling means for freezing the substance in said receptacle and for holding the receptacle in an inverted position in heat receiving relation to a relatively warm medium within the cabinet for releasing the substance from the receptacle, and storage means in intimate heat exchange relation with the cooling means for receiving the frozen substance as it is released from the receptacle.

7. In a refrigerating apparatus comprising in combination, a cabinet, cooling means therein, a receptacle adapted to contain a substance to be frozen, means for holding the receptacle in intimate heat exchange relation with the cooling means for freezing the substance in said receptacle, means especially constructed for holding the receptacle in inverted position in heat receiving relation to a relatively warm medium within the cabinet for releasing the substance from the receptacle, and storage means below the last means and in intimate heat exchange relation with the cooling means for receiving the frozen substance as it is released from the receptacle.

8. Refrigerating apparatus comprising in combination a cabinet, a cooling unit therein, means associated with the cooling unit for holding a receptacle containing material to be frozen and holding the receptacle in inverted position in heat absorbing relation with a relatively warm medium in the cabinet to release the frozen material from the receptacle, and means in the cabinet for receiving the frozen material falling from the receptacle, said means being disposed below said receptacle a distance at least as great as the depth of the receptacle.

9. Refrigerating apparatus comprising in combination a cabinet, a cooling unit therein, means associated with the cooling unit for holding a receptacle of material to be frozen, means carried by the cooling unit for holding the receptacle in inverted position in heat absorbing relation to relatively warm air in the cabinet to release the frozen material from the receptacle, and means in the cabinet for receiving the frozen material falling from the receptacle, said means being disposed below said receptacle a distance at least as great as the depth of the receptacle.

10. In a refrigerating apparatus comprising in combination, a cabinet, a cooling unit therein, a receptacle for containing material to be frozen, and disposed in freezing relation to a relatively cold portion of said unit, means associated with a relatively warm portion of said unit for holding said tray in inverted position to release the frozen material from said receptacle, and means for receiving the released material, said means being disposed below the receptacle a distance at least as great as the depth of the receptacle.

11. In a refrigerating apparatus comprising in combination, a cabinet, a cooling means therein, a receptacle adapted to contain material to be frozen, means for holding the receptacle in intimate heat exchange relation with the cooling means for freezing the material in said receptacle and means especially constructed for holding the receptacle in inverted position in heat receiving relation to a relatively warm medium within the cabinet for releasing the frozen material from the receptacle, and means for receiving the frozen material dropped from the receptacle, said means being disposed below said receptacle a distance at least as great as the depth of the receptacle.

12. In a mechanical refrigerator of the household type the method of harvesting individual ice blocks which consists in placing a partitioned container of ice in an inverted position in heat exchange relation with a relatively warm medium in the refriegrator to separate the ice into blocks and release the blocks, said medium being cooled by the ice melted to release the blocks.

13. In a mechanical refrigerator of the household type the method of harvesting individual ice blocks which consists in placing a partitioned container of ice in an inverted position in heat exchange relation with relatively warm circulating air in the refrigerator to separate the ice into blocks and release the blocks, said circulating air being cooled by the ice melted to release the blocks.

14. A heating apparatus of the class described comprising a support, a heating element associated therewith, and an inverted ice-tray mounted on said support, said support having an opening in the bottom thereof to permit the ice liberated from the tray to fall freely therethrough.

15. A heating apparatus of the class described comprising an opened bottom support, a heating element thermally associated therewith, and an inverted ice tray on said support whereby upon the generating of heat by said heating element the ice is liberated from the tray and falls freely through the support.

In testimony whereof I hereto affix my signature.

HARRY B. HULL.